3,775,479
AMINE COMPOUNDS
Hans Bruderer, Riehen, and Rudolf Rüegg, Bottmingen, Switzerland, assignors to Hoffmann-La Roche Inc., Nutley, N.J.
No Drawing. Application June 17, 1968, Ser. No. 737,287, which is a continuation-in-part of abandoned application Ser. No. 686,759, Nov. 29, 1967. Divided and this application Aug. 2, 1971, Ser. No. 169,562
Claims priority, application Switzerland, Dec. 23, 1966, 18,487/66; May 10, 1968, 7,014/68
Int. Cl. C07c 131/00
U.S. Cl. 260—566 A
1 Claim

ABSTRACT OF THE DISCLOSURE

Compounds of the formula

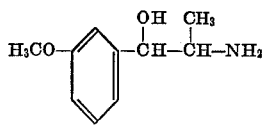

which is present at least partially in (-)-erythro configuration, processes for their preparation and novel intermediates useful therein are disclosed. Said products of Formula I have useful hypertensive activity.

RELATED APPLICATIONS

This application is a division of U.S. patent application Ser. No. 737,287, filed June 17, 1968, which in turn is a continuation-in-part of U.S. patent application Ser. No. 686,759, filed Nov. 29, 1967, now abandoned.

SUMMARY OF THE INVENTION

This invention relates to novel compounds displaying pharmaceutical utility, processes for their preparation and novel intermediates useful therein. More particularly, this invention relates to novel amines of the formula

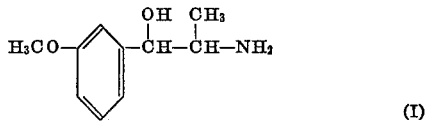

(I)

which is present at least partially in (-)-erythro configuration, pharmaceutically acceptable acid addition salts thereof, processes for their preparation and novel intermediates useful in said processes and having the formulae

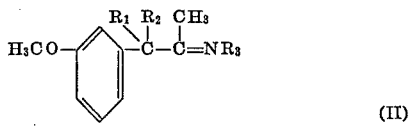

(II)

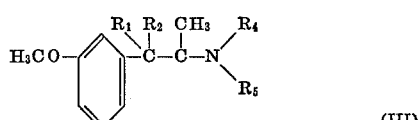

(III)

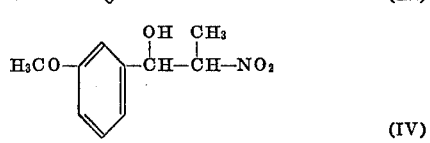

(IV)

in which $R_1$ represents hydroxyl, $R_2$ represents hydrogen or $R_1$ and $R_2$ together represent an oxo group, $R_3$ represents hydrogen, hydroxyl or benzyl and $R_4$ and $R_5$ each represent hydrogen or benzyl; with the provisos that compounds of Formula IV as well as compounds of Formula III, in which $R_1$ represents hydroxyl, are present at least partially in (-)-erythro configuration and, when $R_1$ represents hydroxyl, at least one of the groups $R_4$ and $R_5$ represent benzyl, and acid addition salts of compounds of Formula III.

DETAILED DESCRIPTION OF THE INVENTION

Compounds represented by Formula I possess valuable pharmaceutical properties, for example, they display a long lasting, uniform blood pressure increasing action without significant troublesome side effects or undesirable central nervous system stimulation as evidenced by tachycardia, palpitations, overexcitability and sleep disturbances, and in addition, are relatively safe and non-toxic as shown by tests in warm-blooded animals. Thus, the compounds of Formula I are useful as hypertensive agents in warm-blooded mammals. Of the compounds represented by Formula I, the ones which display the most activity and thus are the preferred embodiments of the invention are racemic erythro-α-(1-aminoethyl)-m-methoxy-benzyl alcohol, (-)-erythro-α-(1-aminoethyl)-m-methoxy-benzyl alcohol and their pharmaceutically acceptable acid addition salts. Most preferred is (-)-erythro-α-(1-aminoethyl)-m-methoxy-benzyl alcohol hydrochloride.

As used herein, "pharmaceutically acceptable acid addition" salts include organic and inorganic acid salts known to be pharmaceutically acceptable. Such acids are, for example, hydrochloric acid, hydrobromic acid, sulfuric acid, phosphoric acid, tartaric acid, citric acid, malic acid, salicylic acid and the like.

The compounds of this invention can be employed as medicaments in the form of pharmaceutical preparations. They can be administered enterally, e.g., in capsule or tablet form, or parenterally, e.g., by intravenous or subcutaneous injection. Since oral dosage forms are effective and well tolerated as shown by tests in animals, this is the preferred method of administration. Suitable dosage forms contain from about 5 mg. to about 50 mg. of active ingredient. The size of the dosage given to any particular subject depends upon the individual requirements, however, suitable oral dosages are from about 0.1 mg./kg. to about 1 mg./kg. animal body weight per day. If parenteral dosages are used, usually about 0.01 mg./kg. to about 0.1 mg./kg. animal body weight per day are suitable.

The preferred oral dosage forms can be used in the form of conventional pharmaceutical excipients containing organic and/or inorganic inert carriers suitable for enteral or parenteral applications such as, water, gelatin, lactose, starches, magnesium stearate, talc, vegetable oils, gums, polyalkylene glycols, Vaseline, etc. The pharmaceutical preparations can be provided in solid forms such as tablets, dragees, suppositories or capsules or in conventional liquid forms, e.g., injectable solutions, emulsions or suspensions. If desire, all the aforementioned dosage forms can be sterilized and/or mixed with conventional pharmaceutical adjuvants such as preservatives, stabilizing agents, wetting agents, emulsifying agents, buffers, or salts used for the adjustment of osmotic pressure. If desired, they can also be used in admixture with other therapeutically valuable substances.

The compounds useful as hypertensive agents are, in the form of their pharmaceutically acceptable acid addition salts, crystalline materials which are soluble in water and polar organic solvents such as methanol, ethanol and the like. These salts are relatively insoluble in non-polar organic solvents such as benzene, ether, petroleum ether and the like.

The effect of the compounds represented by Formula I on the blood pressure of dogs was measured, along with unusual side effects and also toxicity in mice. The compounds represented by Formula I used to demonstrate the blood pressure-increasing action, racemic erythro-α-(1-aminoethyl)-m-methoxy-benzyl alcohol hydrochloride and (-)-erythro-α-(1-aminoethyl)-m-methoxy-benzyl alcohol hydrochloride were administered perorally to intact dogs in the waking state. The test animals had carotid loops, were in generally good health and had not received any drugs for two weeks. The systolic blood pressure of the dogs was measured at the carotid loop oscillometrically every half hour.

The animals were observed during the period of medication and subsequent days.

The results are given as:

(a) intial systolic blood pressure (mm. Hg)±standard deviation
(b) deviation (mm. Hg) from the initial systolic blood pressure during the first ($b_1$) and second ($b_2$) 3-hour period after the oral application.

Results

Rac. erythro-α-(1-aminoethyl)-m-methoxy-benzyl alcohol hydrochloride [($LD_{50}$) mouse: 250–500 mg./kg. p.o.]. 1 mg./kg. of test substance was administered orally to each dog:

| | (a) | ($b_1$) | ($b_2$) | Side-effects |
|---|---|---|---|---|
| Dog: | | | | |
| 1 | 110±1.58 | +29.2 | +30.8 | None. |
| 2 | 108±1.22 | +24.5 | +27.8 | Do. |
| 3 | 129±1.00 | +45.2 | +34.3 | Do. |
| 4 | 124±1.87 | +46.8 | +23.0 | Do. |
| 5 | 13J±1.00 | +69.3 | +29.0 | Do. |

(-)-erythro-α-(1-aminoethyl)-m-methoxy-benzyl alcohol hydrochloride[($LD_{50}$) mouse: 250–500 mg./kg. p.o.]. 0.3 mg./kg. of test substance was administered orally to each dog:

| | (a) | ($b_1$) | ($b_2$) | Side-effects |
|---|---|---|---|---|
| Dog: | | | | |
| 6 | 95±1.58 | +54.2 | +36.0 | None. |
| 7 | 102±2.00 | +36.3 | +20.0 | Do. |
| 8 | 108±1.22 | +33.7 | +18.7 | Do. |
| 9 | 121±1.00 | +34.0 | +24.0 | Do. |

While the preferred compounds of this invention represented by Formula I are rac. erythro-α-(1-aminoethyl)-m-methoxy-benzyl alcohol, (-)-erythro-α-(1-aminoethyl)-m-methoxy-benzyl alcohol and pharmaceutically acceptable acid addition salts, any of the optical antipodes and stereoisomers of the compounds of Formula I are suitable as hypertensives with the proviso that there is present some compound of the (-)-erythro configuration Generally, the hypertensive effect is apparent at dosages around about 1 mg./kg. if at least about 10% by weight of the preferred compound is present. The greater the proportion of (-)-erythro-α-(1-aminoethyl)-m-methoxy-benzyl alcohol present, the more potent the hypertensive activity of the compound.

The designation (-) relates to a compound which in acidic, aqueous solution, e.g., 0.5 N hydrochloric acid, has laevorotatory optical activity.

The compounds of Formula I can be prepared by alternative methods depending on the starting materials.

The compounds of Formulas II, III or IV can be reduced to the amines of Formula I. In the event the more preferred compounds of this invention are desired, the erythro form the compound is isolated by fractional crystallization and the (-) antipode is subsequently separated from the erythro racemate. The base can be then converted into an acid addition salt.

In order to produce a compound useful as an intermediate and represented by Formula II wherein $R_1$ and $R_2$ represent an oxo group and in which $R_3$ signifies hydroxyl, 3'-methoxy-propiophenone is reacted with a lower alkyl nitrite, e.g., isopropyl nitrite, sec. butyl nitrite, amyl nitrite, isoamyl nitrite and the like. This reaction is conveniently effected in an inert solvent, e.g., in ether, tetrahydrofuran, dioxan and the like, in the presence of an anhydrous hydrogen halide such as, for example, hydrogen chloride or hydrogen bromide. The reaction temperature is preferably in the range between about 0° and about 50° C.

In order to produce a compound useful as an intermediate and represented by Formula II wherein $R_1$ and $R_2$ represent an oxo group and in which $R_3$ represents hydrogen or benzyl, 1-(3'-methoxyphenyl)-2-propanone is converted with, for example, selenium dioxide into 1(3'-methoxyphenyl)-1,2-propanedione, which can then be transformed by reaction with ammonia or benzylamine into the corresponding Schiff's base, i.e., a compound of Formula II in which $R_1$ and $R_2$ together represent an oxo group and $R_3$ represents hydrogen or benzyl.

In order to produce a compound useful as an intermediate and represented by Formula II wherein $R_3$ is hydroxyl, α-cyano-m-methoxybenzyl alcohol is reacted with a methyl magnesium halide, then the addition product is hydrolyzed and the resulting α - acetyl-m-methoxy-benzyl alcohol is treated with ammonia, benzylamine or hydroxylamine.

The compounds of Formula III can be produced from 3-methoxypropiophenone. The latter compound can be converted into the corresponding 2-halo-3'-methoxy-propiophenone by treatment with a halogen such as bromine or chlorine, preferably in an inert organic solvent such as, for example, ether, methylene chloride, methanol, glacial acetic acid or the like. Treatment of 2-halo 3'-methoxy-propiophenone with an alkali salt of phthalimide, e.g., potassium phthalimide or sodium phthalimide, preferably in an organic solvent such as, for example, dimethyl formamide, results in N - (m-methoxy-α-methylphenacyl)-phthalimide. The latter is then hydrolyzed to 2-amino - 3' - methoxy-propiophenone, which is subsequently converted to a compound of Formula III by reaction with acidic agents such as mineral acids, e.g., hydrochloric acid, hydrobromic acid or sulphuric acid at a temperature between room temperature (about 20° C.) and the boiling point of the reaction mixture.

The 2 - halo - 3'-methoxy-propiophenone described above can also be reacted with an amine of the formula

in which $R_4$ and $R_5$ have the same significance as in Formula III, to form the compounds of Formula III in which $R_1$ and $R_2$ together represent an oxo group and $R_4$ and $R_5$ each individually represent hydrogen or benzyl. An amine of Formula V in which at least one of $R_4$ and $R_5$ is benzyl is the preferred reactant. The reaction is advantageously effected in an organic solvent such as ether, benzene, toluene, methylene chloride or the like, at a temperature between ca. 0° C. and the boiling point of the reaction mixture. The reaction is conveniently carried out in the presence of an acid binding agent such as, for example, an excess of the amine reactant of Formula V. Other bases such as, for example, dilute sodium hydroxide, or an acid acceptor such as potassium carbonate, sodium carbonate, sodium bicarbonate and the like can also be used as the acid binding agent.

N-benzyl-substituted ketones of either Formula II or Formula III can be reduced to the corresponding alcohols of Formula III. The reduction is preferably effected by treatment with a complex alkali metal hydride such as sodium borohydride or lithium aluminum hydride at a temperature between ca. 0° C. and 50° C. The reduction is conveniently carried out in a solvent such as water or a lower alkanol, e.g., ethanol. The N-benzyl group is not affected by the reduction with metal hydride.

The amines of Formula III in which $R_4$ and $R_5$ are both benzyl can be monodebenzylated to form the compounds of Formula III wherein one of $R_4$ and $R_5$ are benzyl. This monodebenzylation is preferably effected in alkanolic mineral acid, e.g., in methanolic hydrochloric acid, by treatment with hydrogen in the presence of a hydrogenation catalyst such as palladium-carbon or platinum dioxide. The presence of the alcoholic mineral acid is not critical since the reaction can also proceed in a neutral reaction medium.

The compounds of Formula IV can be obtained by condensing m-methoxy-benzaldehyde and nitroethane to form the α-(1-nitroethyl)-m-methoxy-benzyl alcohol of Formula IV. This condensation reaction is preferably effected by reacting m-methoxy-benzaldehyde and nitroethane in the presence of an alkali metal alcoholate, e.g., sodium methylate, sodium ethylate and the like, to produce the compound of Formula IV in the form of its alkali metal salt. The temperature of the reaction conveniently lies between ca. −10° C. and room temperature, e.g., about 20° C. It is preferable to work in the presence of an organic solvent such as a lower alkanol, e.g., methanol, ethanol and the like, or benzene. It is very advantageous to carry out the reaction in the presence of an inert organic base such as pyridine or antipyrine.

The reduction of the compounds of Formulas II, III or IV to the amines of Formula I is preferably carried out by treatment with free hydrogen in the presence of a hydrogenation catalyst such as, for example, palladium-carbon or platinum dioxide. The reaction is advantageously effected in an organic solvent such as a lower alkanol, e.g., methanol, ethanol, isopropanol, sec. butanol or the like and at a temperature between ca. 0° C. and 50° C. The Schiff's bases of Formula II, i.e., the compounds of Formula II in which $R_3$ represents hydrogen or benzyl, are conveniently hydrogenated in a neutral reaction medium. In the case of the other compounds of Formulas II, III and IV, it is preferred to work in an acidic medium containing an acid preferably a mineral acid, e.g., hydrochloric acid, hydrobromic acid, sulphuric acid, phosphoric acid and the like, or a lower alkanecarboxylic acid, e.g., acetic acid, propionic acid and the like.

The diastereomers can be separated from the α-(1-aminoethyl)-m-methoxy-benzyl alcohol obtained as a result of the above described processes, and the preferred erythro form isolated by, e.g., fractional crystallization. The optical antipodes can then be separated from the resulting erythro form and the preferred (-) form isolated.

The rac. erythro form can be produced from an erythro-threo mixture by fractional crystallization from organic solvents or solvent mixtures. Thus, for example, an erythro-threo mixture of α-(1-aminoethyl)-m-methoxy-benzyl alcohol base can be separated into its diastereomers by crystallization from ether, ethyl acetate, ether/petroleum ether, isopropyl ether or isopropyl ether/petroleum ether. Erythro-threo mixtures of α-(1-aminoethyl)-m-methoxy-benzyl alcohol hydrochloride can, for example, be separated into its diastereomers by crystallization from ethanol, ethanol/ether or isopropanol.

The erythro racemate obtained in accordance with the described processes can be separated into its optical antipodes, for example, by conversion of the base into salts with optically active acids such as D(−)-mandelic acid or L(+)-mandelic acid, on the basis of the different solubilities of the salts formed, using fractional crystallization.

The isolation of racemic erythro forms and splitting thereof into optical antipodes can also be effected by utilizing the corresponding isomer of the intermediates and starting materials. For example, the intermediates α-cyano-m-methoxy-benzyl alcohol can be separated into its optical antipodes by conventional means prior to being converted into the compounds of Formula I.

The compounds of Formula I form acid addition salts by reaction with acids. Suitable pharmaceutically acceptable salts are obtained, for example, with hydrochloric acid, hydrobromic acid, sulphuric acid, phosphoric acid, tartaric acid, citric acid, malic acid, salicylic acid and the like. The acid addition salts are crystalline, solid substances which are soluble in water and polar solvents such as methanol, ethanol and the like and are relatively insoluble in non-polar solvents such as benzene, ether, petroleum ether and the like. The preferred salt is the hydrochloride.

The following examples illustrate the invention. All temperatures are in degrees C.

EXAMPLE 1

(a) 2-hydroxyimino-3'-methoxy-propiophenone 900 ml. of isoamyl nitrite are added to a solution of 1000 g. of 3'-methoxy-propiophenone in 5000 ml. of abs. ether dropwise, below the surface of the solution, within 6–7 hours, with stirring to insure that the temperature does not exceed 30°. If necessary, the solution can be cooled with water to insure that the temperature does not exceed 30°. Simultaneously, dry HCl gas is bubbled into the solution at a rate of ca. 2 bubbles/sec. After completion of the isoamyl nitrite and HCl gas addition, the mixture is stirred at room temperature for ca. 12 hours. The reaction solution is then washed with cold water until it no longer reacts congo-acid. Subsequently, the reaction solution is, with the addition of ice, shaken out 10 times, each time with 250 ml. of ice-cold 3 N sodium hydroxide. The basic extracts are combined and the combined extracts are shaken out with 1000 ml. of ether and made congo-acid, after the addition of ice, with conc. hydrochloric acid. The oil which separates out is taken up twice, each time in 1000 ml. of ether. The resulting ethereal solution is washed to neutrality with water and dried over sodium sulphate. The solvent is distilled off under reduced pressure and the resulting residue is dissolved in 600 ml. of warm isopropyl ether, slowly treated, with stirring, with 800 ml. of petroleum ether of boiling point 60°–80° and stirred at room temperature for 2 hours. The reaction mixture is then kept in the refrigerator overnight. The precipitate which forms is filtered, washed with an ice-cold mixture of 50 ml. of isopropyl ether and 500 ml. of petroleum ether, then dried at 50° under reduced pressure. 2-hydroxyimino-3'-methoxy-propiophenone is obtained as beige-colored crystals of melting point 71–73°.

After distilling off the solvent, the mother liquor is taken up in 200 ml. of toluene and rapidly chromatographed on 1000 g. of Kieselgel (granule size 0.2–0.5 mm.). 4000 ml. of toluene elute an oil which is dissolved in 500 ml. of carbon tetrachloride and subsequently ice-cooled for 2 hours. The precipitate which forms is filtered off by suction to yield a further amount of 2-hydroxyimino-3'-methoxy-propiophenone as beige-colored crystals of melting point 70–72°.

(b) Rac. erythro-α-(1-aminoethyl)-m-methoxy-benzyl alcohol hydrochloride 1650 g. of 2-hydroxyimino-3'-methoxy-propiophenone are dissolved in 6000 ml. of abs. methanol and, with cooling, treated with 2500 ml. of conc. hydrochloric acid. The mixture is hydrogenated at 50° and 20 atm. (gauge) of hydrogen after the addition of 100 g. palladium-carbon (5%). After the hydrogenation is completed, the catalyst is removed and the solvent is distilled off. The resulting residue is treated twice with a mixture of 500 ml. of ethanol and 500 ml. of benzene and the solvent is then distilled off. The precipitate which forms is treated with 2000 ml. of ethyl acetate. The mixture is filtered and the resulting residue is successively washed with 1000 ml. each of ethyl acetate, ether and petroleum ether and dried at 40° under reduced pressure. The resulting product, rac. erythro-α-(1-aminoethyl)-m-methoxy-benzyl alcohol hydrochloride has a melting point of 173–175°.

(c) Rac. erythro-α-(1-aminoethyl)-m-methoxy-benzyl alcohol 1002 g. of rac. erythro-α-(1-aminoethyl)-m-methoxy-benzyl alcohol hydrochloride are introduced, with stirring, into a mixture of 2000 ml. of 3 N sodium hydroxide and 5000 ml. of chloroform. The resulting alkaline solution is shaken out three times, each time with 200 ml. of chloroform. The organic phases are combined and washed with saturated NaCl solution and dried over sodium sulphate. The solvent is then distilled off. The resulting crystalline residue is redissolved in and precipitated from 5000 ml. of ethyl acetate. The resulting white crystals of rac. erythro-α-(1-aminoethyl)-m-methoxy-benzyl alcohol have a melting point of 110–111°.

EXAMPLE 2

(a) 2-amino-3'-methoxy-propiophenone 384 g. of 2-hydroxyimino-3'-methoxy-propiophenone are dissolved in 6000 ml. of methanol and treated in the cold with 600 ml. of conc. hydrochloric acid. After the addition of 40 g. of palladium-carbon (5%), the mixture is hydrogenated at room temperature, at a reaction temperature not exceeding 30°. After the uptake of 2 mol. equivalents of hydrogen, the catalyst is separated off and the solvent is distilled off. The resulting residue is treated 3 times, each time with a mixture of 500 ml. of ethanol and 500 ml. of benzene and the solvent is distilled off each time. The resulting residue is treated, with stirring, with 350 ml. of ethyl acetate and the reaction mixture is kept in the refrigerator for ca. 12 hours. The precipitate which forms is then filtered off and washed with ethyl acetate, ether and petroleum ether. The product which results, 2-amino-3'-methoxy-propiophenone hydrochloride is obtained as white crsytals, melting point 173–174°. By re-solution in and precipitation from ethanol-ether, there are obtained white crystals of melting point 177–178°.

(b) 2-bromo-3'-methoxy-propiophenone 82 g. of 3'-methoxy-propiophenone are dissolved in 500 ml. of abs. ether and treated dropwise at room temperature, within ca. 30 minutes, with 27.5 ml. of bromine. Most of the hydrogen bromide which forms is subsequently expelled by the introduction of nitrogen. The ethereal solution is poured onto 500 ml. of ice-water, washed twice with water, once with sodium bicarbonate solution and subsequently washed to neutrality with water and dried over sodium sulphate. The solvent is then distilled off. The resulting 2-bromo-3'-methoxy-propiophenone is obtained as a light yellow oil which boils at 98–106°/0.01 mm.

(c) N-(m-methoxy-α-methylphenacyl)-phthalimide

A solution of 334 g. of 2-bromo-3'-methoxy-propiophenone in 500 ml. of dimethylformamide is treated portionwise with stirring and cooling with a total of 267.2 g. of potassium phthalimide. The mixture is subsequently stirred at 70° for 2 hours. The solvent is then distilled off under reduced pressure and the resulting residue treated with 3000 ml. of water. The precipitate which forms is filtered off and redissolved in and precipitated from acetonitrile. The product, N-(m-methoxy-α-methylphenacyl)-phthalimide is obtained as pale yellow crystals which melt at 133°.

(d) 2-amino-3'-methoxy-propiophenone hydrochloride 60 g. of N-(m-methoxy-α-methylphenacyl)-phthalimide are heated under reflux conditions for 20 hours in a mixture of 240 ml. of conc. hydrochloric acid, 120 ml. of glacial acetic acid and 120 ml. of water. The solvent is then distilled off and the resulting residue is treated with 500 ml. of water, and then active carbon. The solvent is then distilled off. The resulting crystalline residue is dissolved in 100 ml. of ethanol, treated with 100 ml. of ether and store in the refrigerator for ca. 12 hours. The precipitate which forms is then filtered off. The product, 2-amino-3'-methoxy-propiophenone hydrochloride is obtained as white crystals which melt at 177–178°.

(e) Rac. erythro-α-(1-aminoethyl)-m-methoxy-benzyl hydrochloride 10 g. of 2-amino-3'-methoxy-propiophenone hydrochloride are dissolved in 100 ml. of methanol and, after the addition of 1 g. of palladium-carbon (5%), shaken at 50° and 20 atm. (gauge) of hydrogen. After the uptake of 1 mol equivalent of hydrogen, the catalyst is filtered off and the solvent distilled off. The crystalline residue obtained is redissolved in and precipitated from alcohol/ether. The resulting product, rac. erythro-α-(1-aminoethyl)-m-methoxy-benzyl alcohol hydrochloride is white crystals of melting point 173–175°.

EXAMPLE 3

(a) 2-dibenzylamino-3'-methoxy-propiophenone hydrobromide 24.3 g. of 2-bromo-3'-methoxy-propiophenone are dissolved in 200 ml. of toluene and, after the addition of 40 g. of dibenzylamine, held under reflux conditions for ca. 15 hours. After cooling, dibenzylamine hydrobromide precipitates and is filtered off, the solvent is then distilled off. The resulting residue is dissolved in 100 ml. of ethanol and the solution is cooled, precipitating dibenzylamine hydrobromide which is filtered off. The solvent is then distilled off. The oil which is obtained is then dissolved in an excess of aqueous hydrobromic acid, shaken twice, each time with 250 ml. of ether and the acidic solution thus obtained is concentrated. The resulting 2-dibenzylamino-3'-methoxy-propiophenone hydrobromide obtained is redissolved in and precipitated from ethanol to form white crystals which melt at 189–190°.

(b) Rac. erythro-α-(1-aminoethyl)-m-methoxy-benzyl alcohol 4.4 g. of 2-dibenzylamino-3'-methoxy-propiophenone hydrobromide in a mixture of 100 ml. of methanol and 10 ml. of water are hydrogenated at room temperature after the addition of 0.2 g. of palladium-carbon catalyst. After the uptake of the calculated amount of hydrogen, the reaction mixture is filtered off from the catalyst. The solvent is then distilled off. The resulting residue is made alkaline to phenolphthalein by addition of 3 N sodium hydroxide and shaken out with 100 ml. of methylene chloride. The organic phase is then washed to neutrality with saturated NaCl solution and dried over magnesium sulphate. The solvent is then distilled off. The product, rac. erythro-α-(1-aminoethyl)-m-methoxy-benzyl alcohol is obtained as white crystals which melt at 110–111° after re-solution in and precipitation from ether.

EXAMPLE 4

(a) Rac. erythro-α-[1-(dibenzylamino)-ethyl]-m-methoxy-benzyl alcohol 4.4 g. of 2-dibenzylamino-3'-methoxy-propiophenone hydrobromide are dissolved in 100 ml. of methanol. A total of 1g. of sodium borohydride is added to the solution, portionwise, with stirring and cooling. The reaction mixture is stirred at room temperature for 2 more hours. The solvent is then distilled off under reduced pressure and the resulting residue is treated with water and shaken twice, each time with 50 ml. of ether. The ethereal solution is then washed to neutrality with water and dried over sodium sulphate. The solvent is then distilled off. The resulting residue is redissolved in and precipitated from isopropyl ether. The product, rac. erythro-α-[1-(dibenzylamino)-ethyl]-m-methoxy-benzyl alcohol is obtained as white crystals which melt at 103–104°.

(b) Rac. erythro-α-(1-aminoethyl)-m-methoxy-benzyl alcohol 4.0 g. of rac. erythro-α-[1-(dibenzylamino)-ethyl]-m-methoxy-benzyl alcohol are dissolved in 100 ml. of methanol, treated with 1 mol equivalent of 1 N hydrochloric acid and, after the addition of 200 mg. of palladium-carbon (5%), hydrogenated at room temperature. After the uptake of the calculated amount of hydrogen, the catalyst is filtered off and the solvent is distilled off. The residue which forms is made alkaline with saturated sodium carbonate solution and shaken out twice, each time with 50 ml. of ether. The ethereal solution is then washed to neutrality with NaCl solution and dried over sodium sulphate. The solvent is then distilled off. The resulting oily residue crystallizes after sprinkling with isopropyl ether. After re-solution in and precipitation from isopropyl ether, rac. erythro-α-(1-aminoethyl)-m-methoxy-benzyl alcohol is obtained as white crystals which melt at 110–111°.

EXAMPLE 5

(a) 2-benzylamino-3'-methoxy-propiophenone hydrochloride 24.3 g. of 2-bromo-3'-methoxy-propiophenone are dissolved in 200 ml. of abs. benzene and stirred at 40° for ca. 12 hours, after the addition of 21.5 g. of benzylamine. The solvent is then distilled off. The resulting residue is treated with 200 ml. of ether and the benzylamine hydrobromide formed is filtered off. The filtrate is then dissolved in 1 N hydrochloric acid and shaken twice, each time with 250 ml. of ether. The resulting acidic solution is made alkaline by cooling with sodium bicarbonate and is then shaken twice, each time with 250 ml. of ether. The resulting ethereal solution is washed with NaCl solution and dried over sodium sulphate. The solvent is then distilled off. The resulting residue is treated with ethanolic hydrochloric acid and redissolved in and precipitated from ethanol/ether. The product, 2-benzylamino-3'-methoxy-propiophenone hydrochloride is obtained as white crystals which melt at 178–179°.

(b) Rac. erythro-α-(1-benzylaminoethyl)-m-methoxy-benzyl alcohol 3 g. of 2-benzylamino-3'-methoxy-propiophenone hydrochloride are dissolved in 100 ml. of ethanol and treated portionwise with stirring and cooling with a total of 0.7 g. of sodium borohydride. After stirring at room temperature for 2 hours, the solvent is distilled off. The resulting residue is then treated with 50 ml. of water and shaken twice, each time with 50 ml. of ethyl acetate. The ethyl acetate phase is washed with NaCl solution and dried over sodium sulphate. The solvent is then distilled off. After sprinkling with isopropyl ether, rac. erythro-α-(1-benzylaminoethyl)-m-methoxy-benzyl alcohol is obtained as white crystals which melt at 122–123°.

(c) Rac. erythro-α-(1-aminoethyl)-m-methoxy-benzyl alcohol 250 mg. of palladium-carbon (5%) are added to 5 g. of rac. erythro - α - (1 - benzylaminoethyl)-m-methoxy-benzyl alcohol hydrochloride in a mixture of 100 ml. of methanol and 10 ml. of water, and the mixture is hydrogenated at room temperature. After working up in the manner set out in Example 4, rac. erythro-α-(1-aminoethyl)-m-methoxy-benzyl alcohol is obtained as white crystals which melt at 110–111° after re-solution in and precipitation from isopropyl ether.

(d) Rac. erythro-α-(1-benzylaminoethyl)-m-methoxy-benzyl alcohol 1.4 g. of rac. erythro-α-[1-(dibenzylamino)-ethyl]-m-methoxy-benzyl alcohol are dissolved in 50 ml. of methanol, treated with 1.5 ml. of 3 N hydrochloric acid and, after the addition of 100 mg. of palladium-carbon (5%), hydrogenated at room temperature. After the uptake of 2 mol equivalents of hydrogen, the catalyst is filtered off and the solvent is distilled off. The resulting residue is treated with saturated sodium carbonate solution and shaken with 100 ml. of ethyl acetate. The ethyl acetate solution is then washed with NaCl solution and dried over sodium sulphate. The solvent is then distilled off. A crystalline residue is obtained which is redissolved in and precipitated from isopropyl ether. The product, rac. erythro-α-(1-benzylaminoethyl)-m-methoxy-benzyl alcohol melts at 122–123°. The corresponding hydrochloride melts at 162–163° after re-solution in and precipitation from ethanol-ether.

EXAMPLE 6

Rac. erythro-α-(1-aminoethyl)-m-methoxy-benzyl alcohol 4.4 g. of 2-benzylamino-3'-methoxy-propiophenone hydrochloride are dissolved in a mixture of 100 ml. of methanol and 10 ml. of water and, after the addition of 0.2 g. of palladium-carbon (5%), hydrogenated at 35°. After the uptake of 2 mol equivalents of hydrogen, the catalyst is filtered off and the solvent is distilled off. The resulting residue is treated with 20 ml. of saturated sodium carbonate solution and shaken twice, each time with 50 ml. of ethyl acetate. The ethyl acetate phase is washed with NaCl solution and dried over sodium sulphate. The solvent is then distilled off. The resulting oily residue crystallizes after sprinkling with isopropyl ether. After re-solution in and precipitation from isopropyl ether, rac. erythro - α - (1-aminoethyl)-m-methoxy-benzyl alcohol which melts at 110–111° is obtained. The corresponding hydrochloride of this compound melts at 173–175° after re-solution in and precipitation from ethanol/ether.

EXAMPLE 7

(a) α-(1-nitroethyl)-m-methoxy-benzyl alcohol

A sodium methylate solution (which has been previously manufactured from 4.83 g. of sodium and 75 ml. of abs. methanol) is added dropwise to an ice-cold solution of 13.6 g. of m-methoxybenzaldehyde, 200 ml. of abs. ethanol, 200 ml. abs. benzene, 14.75 g. of abs. pyridine and 11.25 g. of nitroethane. The mixture is then stirred at 0° for 2 hours and at room temperature for 2 more hours. Subsequently, a solution of 43.2 ml. of glacial acetic acid in 40 ml. of abs. methanol is added dropwise. The solvent is for the most part distilled off under reduced pressure at 30° and the resulting residue taken up in 250 ml. of ethyl acetate. The organic phase is successively washed with water, sodium bicarbonate solution and water and dried over sodium sulphate. The solvent is then distilled off under reduced pressure at 30°. The product, α-(1-nitroethyl)-m-methoxy-benzyl alcohol is obtained as a diastereomer mixture.

(b) Rac. erythro-α-(1-aminoethyl)-m-methoxy-benzyl alcohol hydrochloride 12.2 g. of α-(1-nitroethyl)-m-methoxy-benzyl alcohol are dissolved in a mixture of 150 ml. of abs. methanol and 4.5 ml. of glacial acetic acid and, after the addition of 1.2 g. of palladium-carbon (5%), hydrogenated at room temperature. The catalyst is filtered off and then the solvent is distilled off. The resulting residue is dissolved in 3 N hydrochloric acid solution and shaken twice, each time with 250 ml. of ether. The acidic phase is made alkaline to phenophthalein with 3 N sodium hydroxide and shaken twice, each time with 100 ml. of ether. The ethereal phase is washed to neutrality with NaCl solution and dried over sodium sulphate. The solvent is then evaporated off. The resulting residue is treated with an excess of ethanolic hydrochloric acid. The solvent is then distilled off. The product, α-(1-aminoethyl)-m-methoxy-benzyl alcohol hydrochloride is obtained as a mixture of the racemic erythro and threo forms. The compound obtained is fractionally redissolved in and precipitated from ethanol/ether to obtain rac. erythro-α-(1-aminoethyl)-m-methoxy-benzyl alcohol hydrochloride which melts at 173–175°.

EXAMPLE 8

(a) (-)-erythro-α-(1-aminoethyl)-m-methoxy-benzyl alcohol 900 g. rac. erythro-α-(1-aminoethyl)-m-methoxy-benzyl alcohol and 750 g. of D(-)-mandelic acid are dissolved in 24,000 ml. of abs. ethanol at 50°. The reaction mixture is then allowed to stand at room temperature for 2 days. A precipitate separates out and is filtered off, washed with 500 ml. of abs. ethanol, then 500 ml. of abs. ether and dried under reduced pressure at 50°. There is obtained (-)-erythro-α-(1-aminoethyl)-m-methoxy-benzyl alcohol D-mandelate of melting point 155–156°, $[\alpha]_D^{25}$= —67.5° (c.=1.0 in methanol). The product is shaken with a mixture of 1000 ml. of 3 N sodium hydroxide and 1000 ml. of chloroform until it dissolves. The resulting aqueous-alkaline solution is then shaken out three times, each time with 200 ml. of chloroform. The chloroform extracts are combined and washed three times, each time with 200 ml. of NaCl solution and dried over sodium sulphate. The solvent is then distilled off. The resulting crystalline residue is redissolved in and precipitated from 1200 ml. of isopropyl ether. The product, (-)-erythro-α-(1-aminoethyl)-m-methoxy-benzyl alcohol is obtained as white crystals which melt at 76–77°, $[\alpha]_D^{25}$=—29.3° (c.=1.0/0.5 N hydrochloric acid). Further amounts of (-)-erythro-α-(1-aminoethyl)-m-methoxy-benzyl alcohol are obtained from the mother liquor. (-)-erythro-α-(1-aminoethyl)-m-methoxy-benzyl alcohol is converted to the corresponding hydrochloride by treatment with ethanolic hydrochloric acid. The hydrochloride melts at 136–137°, $[\alpha]_D^{25}$=—25.7° (c.=1.0/water).

(b) (+)-erythro-α-(1-aminoethyl)-m-methoxy-benzyl alcohol

The ethanolic mother liquor obtained after separation of the (—)-erythro-α-(1-aminoethyl)-m-methoxy-benzyl alcohol D-mandelate, is evaporated to dryness. The resulting residue is treated with 2000 ml. of 3 N sodium hydroxide and shaken until dissolved. The resulting alkaline solution is shaken three times, each time with 200 ml. of chloroform. The chloroform extracts are combined and washed three times, each time with 300 ml. of saturated NaCl solution and dried over sodium sulphate. The solvent is then distilled off. The resulting residue is dissolved with warming in 1700 ml. of ethyl acetate and cooled with ice. The precipitate which thereby forms is filtered off. The mother liquor is then concentrated, the resulting oil is dissolved in 1200 ml. of warm isopropyl ether and the precipitate which forms after allowing to stand at room temperature, is filtered off. The product, (+)-erythro-α-(1-aminoethyl)-m-methoxy-benzyl alcohol is obtained as white crystals which melt at 76–77°, $[\alpha]_D^{25}$=+29.3 (c.=1.0/0.5 N hydrochloric acid). (+)-erythro-α-(1-aminoethyl)-m-methoxy-benzyl alcohol is converted to the hydrochloride by treatment with ethanolic hydrochloric acid. The hydrochloride is obtained as white crystals which after re-solution in and precipitation from ethanol/ether, melt at 134–135°, $[\alpha]_D^{25}$=+24.8° (c.=1.0 in water).

EXAMPLE 9

Manufacture of tablets of the following composition:

| Ingredients: | Parts by weight per tablet, mg. |
|---|---|
| (—)-erythro-α-(1-aminoethyl)-m-methoxy-benzyl alcohol hydrochloride | 10 |
| Lactose | 129.0 |
| Corn starch | 50.0 |
| Pregelatinized corn starch | 8.0 |
| Calcium stearate | 3.0 |
| Tablet weight | 200.0 |

The (—)-erythro-α-(1-aminoethyl)-m-methoxy-benzyl alcohol hydrochloride is mixed with the lactose, corn starch and pregelatinized corn starch in a suitable mixer. The mixture is then passed through a comminuting machine, returned into the mixer and processed to a thick paste with water. The moist mass is then pressed through a No. 12 sieve, spread out on paper and dried at 45°. The resulting dry granulate is then mixed with the calcium stearate in the mixer and pressed to tablets in a conventional tabletting machine.

EXAMPLE 10

Manufacture of a parenteral solution of the following composition:

| Ingredients: | Amount by weight per ml., mg. |
|---|---|
| (—)-erythro-α-(1-aminoethyl)-m-methoxy-benzl alcohol hydrochloride | 10 |
| p-Hydroxybenzoic acid methyl ester | 0.8 |
| p-Hydroxybenzoic acid propyl ester | 0.2 |
| Pyrogen-free water: q.s., ad 1 ml. | |

The ingredients are dissolved in a part of the pyrogen-free water. The solution, adjusted to 1 ml. with pyrogen-free water, is filtered. After standing for 24 hours, the solution is again filtered and filled into ampoules. The ampoules are sealed under nitrogen gassing and sterilized at 120° for 20 minutes.

What is claimed is:

1. The compound 2-hydroxyimino-3'-methoxypropiophenone.

References Cited

UNITED STATES PATENTS 3,090,812  5/1963  Wilbert et al. _____ 260—566 A
3,341,594  9/1967  Thoma et al. _____ 260—566 A BERNARD HELFIN, Primary Examiner G. A. SCHWARTZ, Assistant Examiner U.S. Cl. X.R.

260—568, 566 R, 570.6, 612 D, 501.1; 424—330